United States Patent
Singh et al.

(10) Patent No.: US 10,926,190 B2
(45) Date of Patent: Feb. 23, 2021

(54) PURIFIED LITHIUM BIS(FLUOROSULFONYL)IMIDE (LiFSI) PRODUCTS, METHODS OF PURIFYING CRUDE LiFSI, AND USES OF PURIFIED LiFSI PRODUCTS

(71) Applicant: SES Holdings Pte. Ltd., Singapore (SG)

(72) Inventors: Rajendra P. Singh, Woburn, MA (US); Qichao Hu, Arlington, MA (US)

(73) Assignee: SES Holdings Pte. Ltd., Singapore (SG)

( * ) Notice: Subject to any disclaimer, the term of this patent is extended or adjusted under 35 U.S.C. 154(b) by 0 days.

(21) Appl. No.: 16/570,262

(22) Filed: Sep. 13, 2019

(65) Prior Publication Data
US 2020/0155963 A1 May 21, 2020

Related U.S. Application Data

(60) Provisional application No. 62/768,447, filed on Nov. 16, 2018.

(51) Int. Cl.
*B01D 11/04* (2006.01)
*C07F 1/02* (2006.01)
(Continued)

(52) U.S. Cl.
CPC .......... *B01D 11/0492* (2013.01); *C07F 1/02* (2013.01); *H01G 11/62* (2013.01); *H01M 10/0568* (2013.01)

(58) Field of Classification Search
CPC .......... C01B 21/086; C01B 21/0935; B01D 11/0492; B01D 11/0288; B01D 11/0484; B01D 12/00; B01D 9/0054
See application file for complete search history.

(56) References Cited

U.S. PATENT DOCUMENTS

| 7,919,629 B2 | 4/2011 | Michot |
| 8,377,406 B1 | 2/2013 | Singh et al. |

(Continued)

FOREIGN PATENT DOCUMENTS

| CN | 108373142 A | 8/2018 |
| EP | 3381923 A1 | 10/2018 |

(Continued)

OTHER PUBLICATIONS

Rolf Appel, Gerhard Eisenhauer, Chemische Berichte, 1962, pp. 246-248.

(Continued)

*Primary Examiner* — Ngoc-Yen Nguyen
(74) *Attorney, Agent, or Firm* — Downs Rachlin Martin PLLC

(57) ABSTRACT

Methods of removing target impurities from a crude lithium bis(fluorosulfonyl)imide (LiFSI) to make a purified LiFSI product. In some embodiments, a purification method includes contacting crude LiFSI with a first anhydrous organic solvent to create a solution containing LiFSI and the target impurity(ies), wherein the LiFSI is soluble and the impurity(ies) is/are substantially insoluble. In some embodiments, a second anhydrous organic solvent is added to the solution to precipitate the target impurity(ies), which is then filtered to obtain a filtrate. In some embodiments, solvent is removed from the filtrate to obtain a solid mass containing LiFSI, which may then be contacted with a third anhydrous organic solvent in which the LiFSI is insoluble. The LiFSI may then be isolated from the third anhydrous organic solvent to obtain the purified LiFSI product. Also disclosed are purified LiFSI products and electrochemical devices utilizing purified LiFSI products, among other things.

22 Claims, 2 Drawing Sheets

(51) Int. Cl.
*H01G 11/62* (2013.01)
*H01M 10/0568* (2010.01)

(56) References Cited

U.S. PATENT DOCUMENTS

| 8,580,220 | B2 | 11/2013 | Honda et al. | |
|---|---|---|---|---|
| 8,722,005 | B1 | 5/2014 | Poshusta et al. | |
| 2009/0105502 | A1* | 4/2009 | Umemoto | C07C 303/10 |
| | | | | 562/829 |
| 2016/0308247 | A1 | 10/2016 | Buisine | |
| 2018/0219260 | A1* | 8/2018 | Poshusta | H01M 10/0569 |
| 2018/0362343 | A1* | 12/2018 | Hormes | C01B 21/086 |

FOREIGN PATENT DOCUMENTS

| WO | 2018104675 | A1 | 6/2018 |
|---|---|---|---|
| WO | 2018157240 | A1 | 9/2018 |

OTHER PUBLICATIONS

John K. Ruff and Max Lustig; Inorganic Syntheses, 1967, vol. 11, pp. 138-143.

B. Krumm, A. Vij, R.L. Kirchmeier, J. M. Shreeve, Inorganic Chemistry, 1998, 37, pp. 6295-6303.

Martin Beran, Jiri Prihoda, Zdirad Zak, Milos Cernik, Polyhedron, 2006, 25, pp. 1292-1298.

Martin Beran and Jiri Prihoda; A New Method of the Preparation of Imido-bis(sulfuric acid) Dihalogenide, (F,Cl), and the Potassium Salt of Imido-bis(sulfuric acid) Difluoride; Z. Anorg. Allg. Chem. 2005, 631, pp. 55-59.

International Search Report and Written Opinion dated Feb. 18, 2020, in connection with PCT/IB2019/059851, filed Nov. 15, 2019.

\* cited by examiner

PURIFIED LITHIUM BIS(FLUOROSULFONYL)IMIDE (LIFSI) PRODUCTS, METHODS OF PURIFYING CRUDE LIFSI, AND USES OF PURIFIED LIFSI PRODUCTS

RELATED APPLICATION DATA

This application claims the benefit of priority of U.S. Provisional Patent Application Ser. No. 62/768,447, filed Nov. 16, 2018, and titled "PROCESS FOR THE PURIFICATION OF LITHIUM BIS(FLUOROSULFONYL) IMIDE (LiFSI)", which is incorporated by reference herein in its entirety.

FIELD OF THE INVENTION

The present invention generally relates to the field of lithium bis(fluorosulfonyl)imide (LiFSI). In particular, the present invention is directed to purified LiFSI products, methods of purifying crude LiFSI, and uses of purified LiFSI products.

BACKGROUND

Lithium bis(fluorosulfonyl)imide (LiFSI) has been reported as conducting salt for lithium-based batteries due to its desirable physicochemical and electrochemical properties. LiFSI has a melting point of 131° C. and is thermally stable up to 200° C. It exhibits far superior stability towards hydrolysis compared to lithium hexafluorophosphate ($LiPF_6$), which is a salt commonly used for electrolytes in lithium-ion batteries. LiFSI has aroused intensive interest as an electrolyte/additive in lithium-ion batteries due to its unique properties, such as excellent solubility, ionic conductivity comparable to $LiPF_6$-based electrolytes, cost-effectiveness, environmental benignity, and favorable solid electrolyte interface (SEI) forming property. The level of purity of LiFSI used for battery electrolytes can be critical to the operation and cycle life of the batteries using LiFSI-based electrolytes. However, many commercial processes for synthesizing LiFSI produce byproducts that remain is the crude LiFSI produced by the synthesis processes. The main impurities in LiFSI are lithium fluoride (LiF), lithium chloride (LiCl), lithium sulfate ($Li_2SO_4$), lithium fluorosulfonate ($LiFSO_3$), and acidic-type impurities, for example, hydrogen fluoride (HF). These impurities must be removed, or reduced to various acceptable levels, before using LiFSI salt in a battery. However, they can be challenging to remove.

SUMMARY OF THE DISCLOSURE

In an implementation, the present disclosure is directed to a method of removing one or more target impurities from crude lithium bis(fluorosulfonyl)-imide (LiFSI) containing LiFSI and the one or more target impurities so as to make a purified LiFSI product. The method includes contacting the crude LiFSI with at least one first anhydrous organic solvent under inert conditions to create a solution containing LiFSI and the one or more target impurities, wherein the LiFSI is soluble and each of the one or more target impurities is substantially insoluble in the at least one first anhydrous organic solvent at room temperature; adding at least one second anhydrous organic solvent to the solution so as to precipitate the at least one target impurity, wherein each of the LiFSI and the one or more target impurities is substantially insoluble in the at least one second anhydrous organic solvent; filtering from the solution an insoluble portion of each of the one or more target impurities so as to produce a filtrate; removing solvent from the filtrate so as to obtain a solid mass; contacting the solid mass with at least one third anhydrous organic solvent in which the LiFSI is substantially insoluble; and isolating the LiFSI from the at least one third anhydrous organic solvent to obtain the purified LiFSI product.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
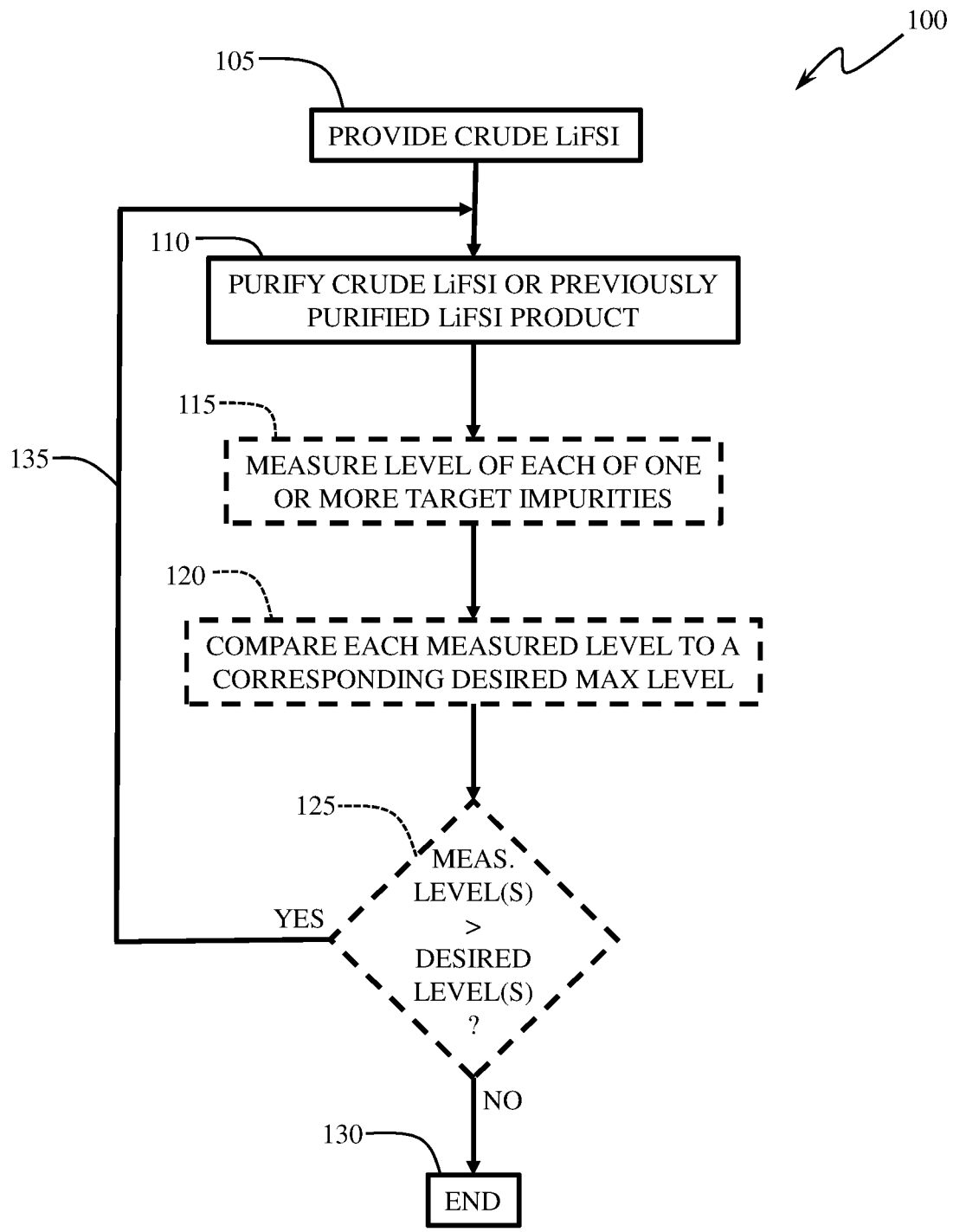
FIG. 1 is a flow diagram illustrating a multi-pass method of purifying lithium bis(fluorosulfonyl)imide (LiFSI) in accordance with aspects of the present disclosure.

In some aspects, the present disclosure is directed to methods of purifying crude lithium bis(fluorosulfonyl)imide (LiFSI) to remove any one or more of various impurities from the crude LiFSI. As used herein and in the appended claims, the term "crude LiFSI" and like terms indicate a synthesis product that contains at least LiFSI and one or more impurities, such as impurities resulting from the synthesis of the LiFSI. Hereinafter and in the appended claims, this type of impurity is referred to as a "synthesis impurity." Each of the impurities targeted to be removed to one extent or another using the disclosed methods is referred to herein and in the appended claims as a "target impurity". In an example, a target impurity can be a synthesis impurity that is a byproduct of the synthesis of the LiFSI as noted above.

As used herein and in the appended claims, the term "anhydrous" refers to having about 1% by weight of water or less, typically about 0.5% by weight of water or less, often about 0.1% by weight of water or less, more often about 0.01% by weight of water or less, and most often about 0.001% by weight of water or less. Within this definition, the term "substantially anhydrous" refers to having about 0.1% by weight of water or less, typically about 0.01% by weight of water or less, and often about 0.001% by weight of water or less.

Throughout the present disclosure, the term "about" when used with a corresponding numeric value refers to ±20% of the numeric value, typically ±10% of the numeric value, often ±5% of the numeric value, and most often ±2% of the numeric value. In some embodiments, the term "about" can mean the numeric value itself.

When describing a chemical reaction, such as any of the synthesis and purification reactions described herein and/or addressed in the appended claims, the terms "treating", "contacting", and "reacting", are used interchangeably and refer to adding or mixing two or more reagents under the conditions sufficient to produce the indicated and/or desired product(s). It should be appreciated that the reaction that produces the indicated and/or desired product may not necessarily result directly from the combination of the reagent(s) that was/were initially added. That is, there may be one or more intermediates that are produced in the mixture and ultimately lead to the formation of the indicated and/or desired product.

At commercial scales, crude LiFSI is usually obtained by neutralizing hydrogen bis(fluorosulfonyl)imide (HFSI), which contains various concentrations of synthesis impurities, such as hydrogen fluoride (HF), fluorosulfuric acid ($FSO_3H$), hydrogen chloride (HCl), and sulfuric acid ($H_2SO_4$), with lithium carbonate ($Li_2CO_3$) or lithium hydroxide (LiOH). Using the LiOH-based synthesis as an example, during this process of making crude LiFSI, the HFSI and the impurities such as HF, $FSO_3H$, HCl, and $H_2SO_4$, are converted to the corresponding Li salt to produce LiFSI, $Li_2SO_4$, $FSO_3Li$, LiF, and LiCl, respectively, by the following schemes:

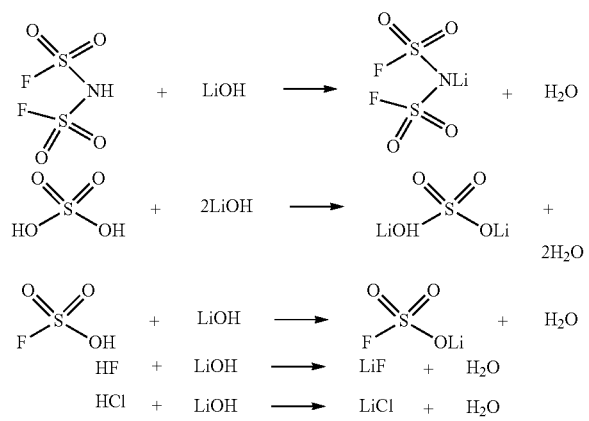

In this example, the $Li_2SO_4$, $FSO_3Li$, LiF, and LiCl are target impurities (here, synthesis impurities) that are desired to be removed from the crude LiFSI. In some embodiments, purification methods of the present disclosure remove one or more synthesis impurities, such as one or more of the $Li_2SO_4$, $FSO_3Li$, LiF, and LiCl, and/or any other impurity having a molecular structure and properties amenable for removal by the disclosed methods, each of which is a "target impurity" in the parlance of this disclosure.

In another aspect, the present disclosure is directed to a purified LiFSI product containing LiFSI and a relatively low level of one or more target impurities, such as one or more synthesis impurities, for example, $Li_2SO_4$, $FSO_3Li$, LiF, and LiCl as noted above. As described in more detail below, such purified LiFSI product may be made using a purification method of the present disclosure that can generate the purified LiFSI product in a single pass through one of the disclosed basic processes or in multiple passes through one or more of the disclosed basic processes.

In still a further aspect, the present disclosure is directed to uses of LiFSI salt products of the present disclosure. For example, LiFSI salt products of the present disclosure can be used to make electrolytes that can be used in any suitable electrochemical device, such as a battery or supercapacitor.

Details of the foregoing and other aspects of the present disclosure are described below.

Example Methods of Purifying Crude LiFSI

While a number of processes for producing LiFSI are known, each of the known methods for synthesizing LiFSI at a commercial scale produces crude LiFSI containing various levels of impurities, such as synthesis impurities. For example, and as noted above, LiFSI is often commercially produced using crude HFSI that is reacted with $Li_2CO_3$ or LiOH, and the crude HFSI contains various synthesis impurities that result in impurities in the crude LiFSI so synthesized.

For example, one method of synthesizing HFSI uses urea ($NH_2CONH_2$) and fluorosulfonic acid ($FSO_3H$). Disadvantages of this process are low yield of HFSI and the isolated HFSI having a large excess of fluorosulfonic acid as an impurity. Since the boiling point (b.p.) of fluorosulfonic acid (b.p. 165.5° C.) and the b.p. of HFSI (b.p. 170° C.) are very close to one another, it is very difficult to separate them from one another by simple fractional distillation [1]. An attempt to remove fluorosulfonic acid has been made by treating a mixture of HFSI and fluorsulfonic acid with sodium chloride where sodium chloride selectively reacts with fluorosulfonic acid to make sodium salts and HCl byproducts. This process has suffered from low yield of purified HFSI, and the HFSI product was also contaminated with some chloride impurities (HCl and NaCl) as impurities.

Another method of synthesizing HFSI for use in LiFSI synthesis involves fluorinating bis(chlorosulfonyl)imide (HCSI) with arsenic trifluoride ($AsF_3$). In this reaction, HCSI is treated with $AsF_3$. Arsenic trifluoride is toxic, and because it has a high vapor pressure, it is particularly difficult to handle on an industrial scale. A typical reaction uses 1:8.6 ratio of HCSI to $AsF_3$. HFSI produced by this method was also found to be contaminated with $AsF_3$ and $AsCl_3$ synthesis impurities, which were found to be a good source of chloride and fluoride impurities [2].

HFSI for use in LiFSI synthesis can also be prepared by fluorinating HCSI with antimony trifluoride ($SbF_3$). The antimony trichloride byproduct of this reaction has both high solubility in HFSI and is sublimatable in nature; it is very difficult to separate from the desired product. The product of this reaction is typically contaminated with antimony trichloride, which is a good source of chloride impurities [3].

Yet another method for producing HFSI for use in LiFSI synthesis involves reacting HCSI with excess anhydrous HF at high temperature [4]. The yield of this reaction is at most 60%, with the product contaminated with fluorosulfonic acid that is produced from the decomposition of HCSI. This by-product is difficult to remove, as the boiling point is close to the boiling point of HFSI. This reaction using anhydrous HF to fluorinate HSCI has achieved >95% yield [5], but still the product is contaminated with fluorosulfonic acid, hydrogen fluoride, hydrogen chloride, and sulfuric acid as synthesis impurities.

Reacting HCSI with bismuth trifluoride ($BiF_3$) has been reported to yield HFSI in a cleaner reaction product. In this reaction, $BiCl_3$ byproduct that is formed can be easily separated from HFSI by fractional distillation, since $BiCl_3$ is not sublimatable [6]. Still, however, the product has some chloride, fluoride, and fluorosulfonic acid as synthesis impurities.

In another method of synthesizing HFSI, potassium bis (fluorosulfonyl)imide (KFSI) is reacted with perchloric acid [7]. In this process, the byproduct potassium perchlorate is considered to be explosive. Also, the isolated HFSI is contaminated with high level of potassium cations and some chloride impurities that are present in KFSI.

Hydrogen bis(fluorosulfonic acid) also known as imidobis(sulfuric acid) difluoride having the formula, $FSO_2NH—O_2F$, is a colorless liquid having a melting point (m.p.) of 17° C., a b.p. of 170° C., and a density 1.892 g/cm$^3$. It is very well soluble in water and in a number of organic solvents. Hydrolysis in water is relatively slow and leads to the formation of HF, H$_2$SO$_4$, and amidosulfuric acid (H$_3$NSO$_3$). HFSI is a strong acid, with a pKa of 1.28 [8].

A purification method of the present disclosure can be used to remove target impurities, such as synthesis impurities and/or other impurities, present in crude LiFSI, for example, a crude LiFSI synthesized using crude HFSI made using any one or more of the foregoing synthesis methods. In some embodiments, the purification method includes contacting crude LiFSI with at least one first anhydrous organic solvent under inert conditions to create a solution containing the crude LiFSI and the one or more target impurities. In some embodiments, the solubility of the LiFSI in the at least one first anhydrous organic solvent is at least about 60% at room temperature, typically in a range of about 60% to about 90%, and the solubility of each of the one or more target impurities is typically no more than about 20 parts per million (ppm) at room temperature, and often, for example, less than about 13 ppm. In some embodiments, the contacting of the crude LiFSI with at least one first anhydrous organic solvent is performed using a minimum amount of the at least one first anhydrous organic solvent. By "minimum amount" in the context of the at least one first anhydrous organic solvent, it is meant that the at least one first anhydrous organic solvent is provided in an amount substantially at which the LiFSI no longer continues to dissolve. In some embodiments, the minimum amount of the at least one anhydrous inorganic solvent falls in a range of about 50 wt. % to about 75 wt. % of the solution.

In some embodiments, the contacting of the crude LiFSI with the at least one first anhydrous organic solvent is performed at a temperature lower than a temperature in a range of about 15° C. to about 25° C. The dissolution of the crude LiFSI in the at least one first anhydrous organic solvent is an exothermic reaction. Consequently, in some embodiments, the temperature of the solution may be controlled using any suitable temperature control apparatus, such as a chiller, thermostat, circulator, etc. In some embodiments, the temperature of the solution is controlled to keep the temperature of the solution below about 25° C. as the at least one anhydrous organic solvent is contacted with the crude LiFSI. To attain the minimum amount of the at least one first anhydrous organic solvent and/or to control the temperature of the solution during the contacting of the crude LiFSI by the at least one first anhydrous organic solvent, the at least one anhydrous organic solvent may be added continuously or continually at precisely controlled rates or in precisely controlled amounts using suitable feed or dosing devices.

The inert conditions during the contacting of the LiFSI with the at least one first anhydrous organic solvent may be created using any suitable technique, such as by using argon gas and/or nitrogen gas, and/or other inert dry (i.e., water-free) gas, among others. The purification method may be performed at any suitable pressure, such as 1 atmosphere of pressure.

Examples of anhydrous organic solvents from which each of the at least one first anhydrous organic solvent may be selected include, but are not necessarily limited to, dimethyl carbonate (DMC), diethyl carbonate (DEC), ethyl methyl carbonate (EMC), propyl methyl carbonate (PMC), ethylene carbonate (EC), fluoroethylene carbonate (FEC), trans butylene carbonate, acetonitrile, malononitrile, adiponitrile, methyl acetate, ethyl acetate, propyl acetate, butyl acetate, methyl propionate (MP), ethyl propionate (EP), methanol, ethanol, propanol, and isopropanol.

After contacting the crude LiFSI with the at least one first anhydrous organic solvent, at least one second anhydrous organic solvent is added to the solution so as to precipitate that at least one target impurity. The at least one second anhydrous organic solvent is selected such that the LiFSI and the one or more target impurities is substantially insoluble (as noted above, it is generally desirable that target impurities should not be soluble more than 20 ppm) in the at least one second anhydrous organic solvent. In some embodiments, at least one second anhydrous organic solvent is added in a minimum amount. By "minimum amount" in the context of the at least one second anhydrous organic solvent, it is meant that the at least one second anhydrous organic solvent is provided in an amount substantially at which the one or more target impurities no longer continue to precipitate out of the solution. In some embodiments, the minimum amount of the at least one anhydrous inorganic solvent falls in a range of greater than 0 wt. % to no more than about 10 wt. % of the solution. The at least one second anhydrous organic solvent may be added under the same temperature, pressure, and inert conditions as present during the contacting of the crude LiFSI with the at least one first anhydrous organic solvent.

Examples of anhydrous organic solvents from which each of the at least one second anhydrous organic solvent may be selected include, but are not necessarily limited to, dichloromethane, dichloroethane, chloroform, pentane, hexane, heptane, octane, nonane, decane, undecane, dodecane.

After adding the at least one second anhydrous organic solvent, an insoluble portion of each of the one or more target impurities is separated, for example, filtered or cannulated, from the solution to produce a filtrate containing LiFSI in solution. The filtration may be performed using any suitable methods, such as using one or more filter media, centrifuging, gravity separation, hydrocycloning, etc. Those skilled in the art will understand the appropriate filtration technique(s) to use in any particular instantiation of a purification method of the present disclosure.

After obtaining the filtrate from the filtration, solvent in the filtrate is removed so as to obtain a solid mass consisting mainly of LiFSI and some reduced amount(s) of the one or more target impurities. The solvent removed will typically be each of the one or more first anhydrous organic solvents and the one or more second anhydrous organic solvents from previous processing. The solvent may be removed using any suitable techniques, such as under suitable temperature and reduced pressure conditions. For example, the removing of the solvent may be performed at a pressure of about 0.5 Torr or less or about 0.1 Torr or less. The temperature during the removal may be, for example, about 25° C. to about 40° C. or less.

After obtaining the solid mass, the solid mass may be contacted with at least one third anhydrous organic solvent, in which LiFSI is substantially insoluble, to further remove more of the one or more target impurities by the one or more target impurities solvating with the third solvent. Another benefit is to remove any ppm level of HF formed during the process, especially by evacuating the solvent at reduced pressure and a slightly higher temperature than room temperature. In some embodiments, the amount of the at least one third anhydrous organic solvent used to contact the solid mass may be at least 50 wt. % of the weight of the solid mass. Examples of anhydrous organic solvents from which each of the at least one third anhydrous organic solvent may be selected include, but are not necessarily limited to, dichloromethane, dichloroethane, chloroform, pentane, hexane, heptane, octane, nonane, decane, undecane, dodecane.

After contacting the solid mass with the at least one third anhydrous organic solvent, the LiFSI is isolated from the at least one third anhydrous organic solvent to obtain a purified LiFSI product that contains a reduced amount of each of the one or more target impurities. The isolating of the LiFSI from the at least one third anhydrous organic solvent may be performed using any one or more suitable techniques, such as filtering the LiFSI in solid form and/or drying the solid LiFSI, such as in vacuo. In some embodiments, the in-vacuo pressure is less than about 0.1 Torr or less than about 0.01 Torr. The resulting purified LiFSI product is typically a white free-flowing powder.

The dried purified LiFSI product may be stored in a dry inert container, such as a dry polytetrafluoroethylene (PTFE) container or a nickel alloy that is inert to free fluoride, at a reduced temperature, such as about 25° C. or below, and within an inert gas, such as argon, to inhibit degradation of the LiFSI during storage.

The following Table illustrates an example of selecting each of a first, second, and third anhydrous organic solvent for an LiFSI purification method of the present disclosure. As seen in the Table, the selected first anhydrous organic solvent is dimethyl carbonate and the selected second and third anhydrous organic solvent is dichloromethane.

| Compound | 1st Organic Solvent Solvent/Solubility | 2nd & 3rd Organic Solvent (Insoluble) |
| --- | --- | --- |
| $LiSO_2FNSO_2F$ (LiFSI) | Dimethyl carbonate > 90% | Dichloromethane |
| $Li_2SO_4$ (lithium sulfate) | Dimethyl carbonate < 5 ppm | Dichloromethane |
| LiF (lithium fluoride) | Dimethyl carbonate < 13 ppm | Dichloromethane |
| LiCl (lithium chloride) | Dimethyl carbonate < 5 ppm | Dichloromethane |

Based on the Table above, the solubility of LiFSI in dimethyl carbonate is >90%, and it is insoluble in dichloromethane. On the other hand, the solubility of target impurities, such as the LiF, LiCl, and $Li_2SO_4$ in this example, is less than 13 ppm in dimethyl carbonate under an anhydrous condition. Therefore, anhydrous dimethyl carbonate and anhydrous dichloromethane solvents have been chosen in this example of purifying crude LiFSI to obtain a purified LiFSI product in accordance with the present disclosure. In accordance with aspects of the methods described above, crude LiFSI containing impurities reported in the Table above, may be mixed in dimethyl carbonate in about 40% to about 75% concentration at around 25° C. and stirred at room temperature followed by addition of dichloromethane about 2% to about 10% to precipitate the target impurities. The target impurities may then be removed, for example, by filtration, and the filtrate may be concentrated to dryness. The obtained solid may then be treated with anhydrous dichloromethane to remove any target HF impurity, which is soluble in dichloromethane. However, LiFSI is insoluble in dichloromethane.

Purified LiFSI may be recovered by filtration and finally dried at reduced pressure (in one example, at less than about 0.1 Torr) and at less than about 40° C. to achieve a white free-flowing powder. In this example, the white powder was stored under argon atmosphere in a PTFE container.

Depending on the concentration(s) of the target impurity(ies) in the crude LiFSI being purified using any one of the above methodologies and on the desired maximum concentration(s) of one or more of those target impurities in the desired purified LiFSI product, it may be necessary to perform a multi-pass method to sequentially reduce the amount(s) of the one or more target impurities with each pass. Such a multi-pass method may utilize any one or more of the foregoing methodologies in series to continually reduce the level of each of one or more target impurities initially in the crude LiFSI and then that may still be remaining in the resulting purified LiFSI product. An example multi-pass purification method 100 of the present disclosure is illustrated in FIG. 1.

Referring to FIG. 1, at block 105, a crude LiFSI containing one or more target impurities present at certain level(s) is provided. At block 110, the crude LiFSI is purified using any one of the methodologies described above. An end result of the purification at block 110 is a purified LiFSI product in which the level of each target impurity has been reduced. At optional block 115, the level of each of one or more of the target impurities in the purified LiFSI product is measured using a suitable measurement procedure. At optional block 120, each of the measured levels is compared to a maximum desired level for the corresponding target impurity that is acceptable to be in the purified LiFSI product. At optional block 125, it is determined whether any one or more of the measured levels exceeds the corresponding desired maximum level. If not, i.e., if each measured level is below the corresponding desired maximum level, then the purified LiFSI product meets the desired impurity-level specification and does not need further purification. Therefore, the multi-pass purification method 100 can end at block 130.

However, if at block 125 any one or more of the measured levels exceeds the corresponding desired maximum level(s), then the purified LiFSI product purified in the previous pass through purification at block 110 may be purified at block 110 via a loop 135. In this pass through purification at block 110, the anhydrous organic solvent(s) used for making the solution and/or washing the crystallized LiFSI may be the same or different as used in the previous pass through purification at block 110. At the end of purification at block 110, at optional blocks 115 and 120 one or more measurements of the target impurity level(s) and one or more comparisons of the measured level(s) to one or more corresponding desired maximum levels can be made to determine whether the method 100 can end at block 130 or the LiFSI in the purified LiFSI product of the most recent pass should be subjected to purification again via the loop 135.

A nonlimiting but illustrative example of where a multi-pass purification method could be useful is a lithium-based electrolyte, such as LiFSI, for a lithium-based battery. Crude LiFSI would typically have chloride impurities, such as LiCl from HCl synthesis impurities in crude HFSI used to make the LiFSI, on the order of 150 ppm or more. However, such chloride levels are corrosive to lithium-metal batteries. Consequently, it is desired to keep chloride levels in LiFSI-based electrolytes for lithium-metal batteries low, such as less than about 10 ppm or less than 1 ppm. Using a multi-pass purification methodology of the present disclosure, such as the multi-pass purification method 100 illustrated in FIG. 1, for crude LiFSI used to synthesize the LiFSI salt used in the electrolyte may be a useful way of achieving such low chloride levels.

As a non-limiting but illustrative example, multi-pass purification method 100 may be used to lower the chlorine (in the form of target impurity LiCl) content in an LiFSI product to below 1 ppm, starting with crude LiFSI containing 200 ppm of LiCl as a synthesis impurity. At block 105, a desired amount of the crude HFSI is provided. At block 110, the crude LiFSI is purified using any of the purification methodologies described above or exemplified below.

At optional block 115, the level of LiCl (or chlorides) in the purified LiFSI product are measured to be 100 ppm. At optional block 120, the measured level of 100 ppm is compared against the less-than-1 ppm requirement. At optional block 125, since 100 ppm is greater than the less-than-1 ppm requirement, the purified LiFSI product is processed at block 110, via loop 135, using the same or differing purification process as used to purify the initial crude LiFSI. In this second pass, the starting target impurity level is 100 ppm, and the ending impurity level in the twice-purified LiFSI product is now 20 ppm, as measured at optional block 115. After comparing this 20 ppm level to the less-than-1 ppm requirement at optional block 120, at optional block 125 it is determined that the twice-purified LiFSI product needs to be purified again at block 110, via loop 135, with the same or different purification method used in either of the two prior passes.

In this third pass, the starting target impurity level is 20 ppm, and the ending impurity level in the thrice-purified LiFSI product is now less than 1 ppm, as measured at optional block 115. After comparing this less-than-one ppm level to the less-than-1 ppm requirement at optional block 120, at optional block 125 it is determined that the thrice-purified LiFSI product satisfies the requirement such that multi-pass purification method 100 can end at block 130.

EXAMPLES

The above methodologies are further illustrated by the following examples, although it will be understood that these examples are included merely for purposes of illustration and are not intended to limit the scope of the present disclosure. Unless otherwise stated, all the chemicals used in these examples were of high purity and obtained from reputable commercial sources. Stringent precautions were taken to exclude moisture from the processes, and reactions were performed using well-ventilated hoods.

Example 1

Purification of LiFSI using dimethyl carbonate (DMC) and dichloromethane: In a 500 mL dry flask, crude LiFSI (250 g) containing various level of impurities, here, $FSO_3^-=$ 400 ppm, $Cl^-=50$ ppm, $F^-=200$ ppm, $SO_4^{2-}=200$ ppm, and water=200 ppm, was taken under a nitrogen atmosphere and cooled to 10° C. with a water bath. Anhydrous DMC (250 g (50 wt. %)) was added to the flask portion-wise with stirring, followed by an addition of 20 g (4 wt. %) of anhydrous dichloromethane. The mixture was stirred at room temperature for 1 hour. Insoluble impurities were removed from the mixture by filtration. The filtrate was concentrated at reduced pressure to obtain a solid, which was then treated with anhydrous dichloromethane (200 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 95% yield. In this example, the purified LiFSI product had the following impurities: $FSO_3^-=$ 100 ppm; $Cl^-=10$ ppm; $F^-=50$ ppm; $SO_4^{2-}=60$ ppm; and water=50 ppm.

Example 2

Purification of LiFSI using ethyl methyl carbonate (EMC) and dichloromethane: In a 500 mL dry flask, crude LiFSI (250 g) with various level of impurities, here, $FSO_3^-=200$ ppm, $Cl^-=10$ ppm, $F^-=100$ ppm, $SO_4^{2-}=100$ ppm, and water=100 ppm, was taken under a nitrogen atmosphere and cooled to 10° C. with a water bath. Anhydrous EMC (200 g; (~44 wt. %)) was added to the flask portion-wise with stirring, followed by addition of 25 g (~5.6 wt. %) of anhydrous dichloromethane. The mixture was stirred at room temperature for 1 hour. Insoluble impurities were removed by filtration. The filtrate was concentrated at reduced pressure to obtain a solid, which was then treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 92% yield. In this example, the purified LiFSI had the following impurities: $FSO_3^-=40$ ppm; $Cl^-=1$ ppm; $F^-=10$ ppm; $SO_4^{2-}=20$ ppm; and water=30 ppm.

Example 3

Purification of LiFSI using Diethyl carbonate (DEC) and dichloromethane: In a 500 mL dry flask, crude LiFSI (250 g) containing various level of impurities, here, $FSO_3^-=400$ ppm, $Cl^-=50$ ppm, $F^-=200$ ppm, $SO_4^{2-}=200$ ppm, and water=200 ppm, was taken under a nitrogen atmosphere and cooled to 10° C. with a water bath. Anhydrous DEC (250 g (50 wt. %)) was added to the flask portion-wise with stirring, followed by addition of 20 g (4 wt. %) of anhydrous dichloromethane. The mixture was stirred at room temperature for 1 hour. Insoluble impurities were removed from the mixture by filtration. The filtrate was concentrated at reduced pressure to obtain a solid, which was then treated with anhydrous dichloromethane (200 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 90% yield. In this example, the purified LiFSI product has the following impurities: $FSO_3^-=$ 80 ppm; $Cl^-=5$ ppm; $F^-=30$ ppm; $SO_4^{2-}=50$ ppm; and water=45 ppm.

Example 4

Purification of LiFSI using dipropyl carbonate (DPC) and dichloromethane: In a 500 mL dry flask, crude LiFSI (250 g) containing various level of impurities, here, $FSO_3^-=200$ ppm, $Cl^-=10$ ppm, $F^-=100$ ppm, $SO_4^{2-}=100$ ppm, and water=100 ppm, was taken under a nitrogen atmosphere and cooled to 10° C. with a water bath. Anhydrous dipropyl carbonate (200 g (~44 wt. %)) was added to the flask portion-wise with stirring, followed by addition of 20 g (~4.4 wt. %) of anhydrous dichloromethane. The mixture was stirred at room temperature for 1 hour. Insoluble impurities were removed from the mixture by filtration. The filtrate was concentrated at reduced pressure to obtain a solid, which was treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 90% yield. In this example, the purified LiFSI product had the following impurities: $FSO_3^-=30$ ppm; $Cl^-=1$ ppm; $F^-=11$ ppm; $SO_4^{2-}=15$ ppm; and water=30 ppm.

Example 5

Purification of LiFSI using methyl propyl carbonate (MPC) and dichloromethane: In a 500 mL dry flask, crude LiFSI (250 g) containing various level of impurities, here, $FSO_3^-$=200 ppm, $Cl^-$=10 ppm, $F^-$=100 ppm, $SO_4^{2-}$=100 ppm, and water=100 ppm, was taken under a nitrogen atmosphere and cooled to 10° C. with a water bath. Anhydrous methyl propyl carbonate (MPC) (200 g (~44.4 wt. %)) was added to the flask portion-wise with stirring, followed by an addition of 20 g (~4.4 wt. %) of anhydrous dichloromethane. The mixture was stirred at room temperature for 1 hour. Insoluble impurities were removed by filtration. The filtrate was concentrated at reduced pressure to obtain a solid, which was treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 91% yield. In this example, the purified LiFSI product had the following impurities: $FSO_3^-$=32 ppm; $Cl^-$=2 ppm; $F^-$=12 ppm; $SO_4^{2-}$=22 ppm; and water=35 ppm.

Example 6

Purification of LiFSI using ethyl acetate and chloroform: In a 500 mL dry flask, crude LiFSI (250 g) containing various level of impurities, here, $FSO_3^-$=200 ppm, $Cl^-$=10 ppm, $F^-$=100 ppm, $SO_4^{2-}$=100 ppm, and water=100 ppm, was taken under nitrogen atmosphere and cooled to 10° C. with a water bath. Anhydrous ethyl acetate (150 g (37.5 wt. %)) is added to the flask portion-wise with stirring, followed by addition of 20 g (5 wt. %) of anhydrous chloroform. The mixture was stirred at room temperature for 1 hour. Insoluble impurities were removed by filtration. The filtrate was concentrated at reduced pressure to obtain a solid, which was treated with anhydrous chloroform (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 88% yield. In this example, the purified LiFSI had the following impurities: $FSO_3^-$=40 ppm; $Cl^-$=2 ppm; $F^-$=15 ppm; $SO_4^{2-}$=20 ppm; and water=40 ppm.

Example 7

Purification of LiFSI using butyl acetate and dichloromethane: In a 500 mL dry flask, crude LiFSI (200 g) containing various level of impurities, here, $FSO_3^-$=200 ppm, $Cl^-$=10 ppm, $F^-$=100 ppm, $SO_4^{2-}$=100 ppm, and water=100 ppm, was taken under nitrogen atmosphere and cooled to 10° C. with a water bath. Anhydrous butyl acetate (150 g (~43 wt. %)) was added to the flask portion-wise with stirring followed by addition of 30 g (~8.6 wt. %) of anhydrous dichloromethane. The mixture was stirred at room temperature for 1 hour. Insoluble impurities were removed by filtration. The filtrate was concentrated at reduced pressure to obtain a solid, which was treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 89% yield. In this example, the purified LiFSI product had the following impurities: $FSO_3^-$=38 ppm; $Cl^-$=1 ppm; $F^-$=15 ppm; $SO_4^{2-}$=22 ppm; and water=40 ppm.

Example 8

Purification of LiFSI using acetonitrile and dichloromethane: In a 500 mL dry flask, crude LiFSI (200 g) containing various level of impurities, here, $FSO_3^-$=200 ppm, $Cl^-$=10 ppm, $F^-$=100 ppm, $SO_4^{2-}$=100 ppm, and water=100 ppm, was taken under nitrogen atmosphere and cooled to 10° C. with water bath. Anhydrous butyl acetate (150 g (~43 wt. %)) was added in portion-wise with stirring followed by addition of 30 g (~8.6 wt. %) of anhydrous dichloromethane. The mixture was stirred at room temperature for 1 hour. Insoluble impurities were removed by filtration. The filtrate was concentrated at reduced pressure to obtain a solid, which was treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 90% yield. In this example, the purified LiFSI had the following impurities: $FSO_3^-$=50 ppm; $Cl^-$=5 ppm; $F^-$=20 ppm; $SO_4^{2-}$=22 ppm; and water=38 ppm.

Example Purified LiFSI Products

Using any of the foregoing purification methodologies, such as any of the single-pass purification methodologies disclosed above or multi-pass methodology 100 of FIG. 1, the resulting purified LiFSI products can have exceptionally low levels of target impurities removed by the purification method. For example, a purified LiFSI product of the present disclosure in which at least one of the target impurities is LiCl can have an LiCl ($Cl^-$) level less than or equal to 10 ppm, or less than 1 ppm. As another example, a purified LiFSI product of the present disclosure in which at least one of the target impurities includes LiF ($F^-$), $FSO_3Li$ ($FSO_3^-$), and LiCl ($Cl^-$) can have: $F^-$ less than or equal to about 80 ppm, $FSO_3^-$ less than or equal to about 100 ppm, and $Cl^-$ less than about 100 ppm; $F^-$ less than or equal to about 40 ppm, $FSO_3^-$ less than or equal to about 250 ppm, and $Cl^-$ less than or equal to about 20 ppm; or $F^-$ less than or equal to about 200 ppm, $FSO_3^-$ less than or equal to about 100 ppm, and $Cl^-$ less than or equal to about 30 ppm. In another example, each of the foregoing levels of impurities and combinations thereof can be achieved starting with a crude LiFSI having about 200 ppm or more of $F^-$, about 200 ppm or more of $FSO_3^-$, and/or about 200 ppm or more of $Cl^-$. In yet another example, a purified LiFSI product of the present disclosure in which at least one of the target impurities is $SO_4^{2-}$ can have an $SO_4^{2-}$ level less than or equal to about 280 ppm, or less than or equal to about 100 ppm. In a further example, each of the foregoing $SO_4^{2-}$ levels can be achieved starting with a crude LiFSI having about 500 ppm or more of $SO_4^{2-}$. A useful feature of purification methods of the present disclosure is the ability to remove differing types of target impurities simultaneously with one another in each (or the only) pass through of the method.

Example Uses of Purified LiFSI Products

As mentioned above, a purified LiFSI product may be used to make a purified LiFSI-based electrolyte for an electrochemical device, among other things. Here, the purity of the purified electrolyte flows from the fact that the purified LiFSI product has been purified in accordance with any one or more of the methods disclosed herein. Such purified electrolytes can be made using any of a variety of methods, such as by mixing a purified LiFSI product (salt) of the present disclosure with one or more solvents, one or more diluents, and/or one or more additives, which solvents, diluents, and additives may be known in the art.

Figure 2:
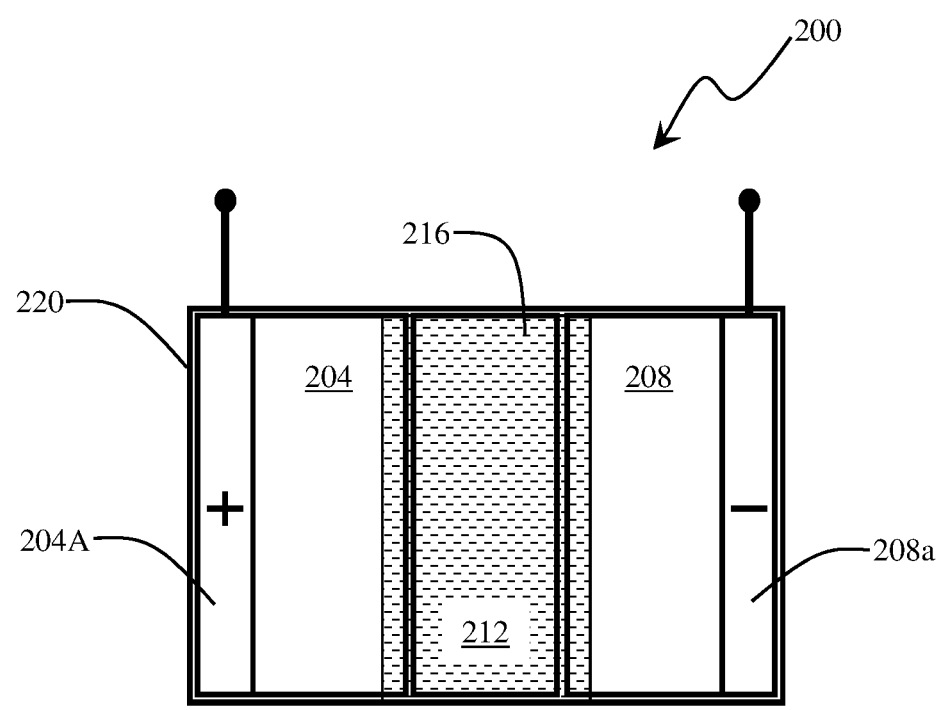
FIG. 2 is a high-level diagram illustrating an electrochemical device made in accordance with aspects of the present disclosure.

FIG. 2 illustrates an electrochemical device 200 made in accordance with aspects of the present disclosure. Those skilled in the art will readily appreciate that the electrochemical device 200 can be, for example, a battery or a supercapacitor. In addition, those skilled in the art will readily understand that FIG. 2 illustrates only some basic functional components of the electrochemical device 200 and that a real-world instantiation of the electrochemical device, such as a secondary battery or a supercapacitor, will typically be embodied using either a wound construction or a stacked construction. Further, those skilled in the art will understand that the electrochemical device 200 will include other components, such as electrical terminals, seal(s), thermal shutdown layer(s), and/or vent(s), among other things, that, for ease of illustration, are not shown in FIG. 2.

In this example, the electrochemical device 200 includes spaced-apart positive and negative electrodes 204, 208, respectively, and a pair of corresponding respective current collectors 204A, 208A. A porous dielectric separator 212 is located between the positive and negative electrodes 204, 208 to electrically separate the positive and negative electrodes but to allow ions of a purified LiFSI-based electrolyte 216 made in accordance with the present disclosure to flow therethrough. The porous dielectric separator 212 and/or one, the other, or both of the positive and negative electrodes 204, 208, depending on whether porous or not, is/are impregnated with the purified LiFSI-based electrolyte 216. In FIG. 2, both the positive and negative electrodes 204, 208 are illustrated as being porous by way of the purified LiFSI-based electrolyte 216 being illustrated as extending into them. As described above, a benefit of using a purified LiFSI-based electrolyte of the present disclosure for purified LiFSI-based electrolyte 216 is that impurities that can be in LiFSI-based electrolytes, such as synthesis impurities, can be reduced to levels that are acceptable (e.g., meet one or more impurity level specifications) for use in the electrochemical device 200. Examples of purified LiFSI products (salts) and example low levels of their various impurities that can be used to make purified LiFSI-based electrolyte 216 are described above. The electrochemical device 200 includes a container 220 that contains the current collectors 204A, 208A, the positive and negative electrodes 204, 208, the porous dielectric separator 212, and the purified LiFSI-based electrolyte 216.

As those skilled in the art will understand, depending upon the type and design of the electrochemical device, each of the positive and negative electrodes 204, 208 comprises a suitable material compatible with the alkali-metal ions and other constituents in the purified LiFSI-based electrolyte 216. Each of the current collectors 204A, 208A may be made of any suitable electrically conducting material, such as copper or aluminum, or any combination thereof. The porous dielectric separator 212 may be made of any suitable porous dielectric material, such as a porous polymer, among others. Various battery and supercapacitor constructions that can be used for constructing the electrochemical device 200 of FIG. 2, are known in the art. If any of such known constructions is used, a novelty of electrochemical device 200 lies in the high purity of the purified LiFSI-based electrolyte 216 that has not been achieved with conventional methods of making LiFSI salts and corresponding electrolytes.

In one example, the electrochemical device 200 may be made as follows. The purified LiFSI-based electrolyte 216 may be made starting with a crude LiFSI, which is then purified using any one or more of the purification methods described herein to create a purified LiFSI product having suitable low levels of one or more target impurities. In an alternative example, crude HFSI may first be synthesized, such as by any of the synthesis methods described above, and this crude HFSI can be used to synthesize crude LiFSI. This crude LiFSI can be purified using any one or more of the purification methods described herein to create a purified LiFSI product (salt). This purified LiFSI product may then be used to make the purified LiFSI-based electrolyte 216, for example, by adding one or more solvents, one or more diluents, and/or one or more additives that enhance the performance of the electrochemical device 200. The purified LiFSI-based electrolyte 216 may then be added to the electrochemical device 200, after which the container 220 may be sealed.

In some aspects, the present disclosure is directed to a method of removing one or more target impurities from crude lithium bis(fluorosulfonyl)-imide (LiFSI) containing LiFSI and the one or more target impurities so as to make a purified LiFSI product. The method includes contacting the crude LiFSI with at least one first anhydrous organic solvent under inert conditions to create a solution containing LiFSI and the one or more target impurities, wherein the LiFSI is soluble and each of the one or more target impurities is substantially insoluble in the at least one first anhydrous organic solvent at room temperature; adding at least one second anhydrous organic solvent to the solution so as to precipitate the at least one target impurity, wherein each of the LiFSI and the one or more target impurities is substantially insoluble in the at least one second anhydrous organic solvent; filtering from the solution an insoluble portion of each of the one or more target impurities so as to produce a filtrate; removing solvent from the filtrate so as to obtain a solid mass; contacting the solid mass with at least one third anhydrous organic solvent in which the LiFSI is substantially insoluble; and isolating the LiFSI from the at least one third anhydrous organic solvent to obtain the purified LiFSI product.

In one or more embodiments, a method of removing one or more target impurities from crude LiFSI may further comprise A) measuring a concentration of at least one of the one or more impurities in the purified LiFSI product; B) determining if the concentration of the at least one of the one or more impurities satisfies a desired concentration limit; and C) if the concentration does not satisfy the desired concentration limit, then performing the method above using the purified LiFSI product.

In one or more embodiments, the method above may further comprise repeating A, B, and C until the concentration satisfies the desired concentration limit.

In one or more embodiments of the method above, wherein A includes measuring the concentration of LiCl; and B includes determining if the concentration is less than about 100 parts per million (ppm).

In one or more embodiments of the method above, wherein B includes determining if the concentration is less than 1 ppm.

In some aspects, the present disclosure is directed to a method of making an electrochemical device, the method comprising: purifying lithium bis(fluorosulfonyl)imide (LiFSI) salt using any one of the methods of removing one or more target impurities from crude LiFSI disclosed herein to create a purified LiFSI salt; formulating an electrolyte using the purified LiFSI salt; providing an electrochemical device structure that includes a positive electrode, a negative electrode spaced from the positive electrode, and a volume that extends between the positive and negative electrodes and, when the electrolyte is present therein allows ions in the electrolyte to move between the positive and negative electrodes; and adding the electrolyte to the volume.

In one or more embodiments of the method above, the electrochemical device is an electrochemical battery, and the electrochemical device structure further includes a separator located within the volume.

In one or more embodiments of the method above, the electrochemical battery is a lithium-ion battery.

In one or more embodiments of the method above, the electrochemical battery is a lithium-metal battery.

In one or more embodiments of the method above, the electrochemical battery is a supercapacitor.

In some aspects, the present disclosure is directed to a purified lithium bis(fluorosulfonyl)imide (LiFSI) product made by a purification process, the purified LiFSI product comprising: LiFSI; one or more impurities that are byproducts of the synthesis process, wherein the one or more impurities includes: LiCl present in an amount less than about 100 parts per million (ppm) relative to the purified LiFSI product; LiSO3H present in an amount less than about 500 ppm relative to the purified LiFSI product; and LiF present in an amount less than about 150 ppm relative to the purified LiFSI product.

In one or more embodiments of the LiFSI product, the LiCl is present in an amount less than about 10 ppm relative to the purified HFSI product.

In one or more embodiments of the LiFSI product, the LiCl is present in an amount less than 1 ppm relative to the purified LiFSI product.

In some aspects, the present disclosure is directed to an electrochemical device, comprising: a positive electrode; a negative electrode spaced from the positive electrode; a porous dielectric separator located between the positive and negative electrodes; and an electrolyte contained within at least the porous dielectric separator, the electrolyte made using the purified LiFSI product previously disclosed herein.

In one or more embodiments, the electrochemical device is a lithium battery.

In one or more embodiments, the electrochemical device is a lithium-metal secondary battery.

In one or more embodiments, the electrochemical device is a supercapacitor.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

CITED REFERENCES

Each of the following references is incorporated by reference for the relevant subject matter taught as determined from the location herein of the corresponding citation.

[1] Rolf Appel, Gerhard Eisenhauer, Chemische Berichte, 1962, 246-248.

[2] Inorganic Syntheses, 1967, 11, 138-143.

[3] Ref. B. Krumm, A. Vij, R. L. Kirchmeier, J. M. Shreeve, Inorganic Chemistry, 1998, 37, 6295-6303.

[4] U.S. Pat. No. 7,919,629, titled "SULPHONYL-1,2,4-TRIAZOLE SALTS" and issued on Apr. 5, 2011, in the name of Christophe Michot.

[5] U.S. Pat. No. 8,722,005, titled "SYNTHESIS OF HYDROGEN BIS(FLUORO-SULFONYL)IMIDE" and issued on May 13, 2014, in the names of Joseph C. Poshuta, Jerry L. Martin, and Rajendra P. Singh.

[6] U.S. Pat. No. 8,377,406, titled "SYNTHESIS OF BIS(FLUORO-SULFONYL)IMIDE" and issued on Feb. 19, 2013, in the names of Rajendra P. Singh, Joseph C. Poshusta, and Jerry L. Martin.

[7] Martin Beran, Jiri Prihoda, Zdirad Zak, Milos Cernik, Polyhedron, 2006, 25, 1292-1298.

[8] Z. Anorg. Allg. Chem. 2005, 631, 55-59.

What is claimed is:

1. A method of removing one or more target impurities from crude lithium bis(fluorosulfonyl)-imide (LiFSI) containing LiFSI and the one or more target impurities so as to make a purified LiFSI product, the method comprising:

contacting the crude LiFSI, in solid form, with a first amount of at least one first anhydrous organic solvent under inert conditions to create a solution containing LiFSI and the one or more target impurities, wherein the LiFSI has a higher solubility in the at least one first anhydrous organic solvent at room temperature than each of the one or more target impurities, wherein the at least one first anhydrous organic solvent includes at least one solvent selected from the group consisting of dimethyl carbonate (DMC), diethyl carbonate (DEC), ethyl methyl carbonate (EMC), propyl methyl carbonate (PMC), ethylene carbonate (EC), fluoroethylene carbonate (FEC), trans butylene carbonate, acetonitrile, malononitrile, adiponitrile, methyl acetate, ethyl acetate, propyl acetate, butyl acetate, methyl propionate (MP), ethyl propionate (EP), methanol, ethanol, propanol, and isopropanol;

following contacting the crude LiFSI with the first amount of the at least one first anhydrous organic solvent, adding to the solution at least one second anhydrous organic solvent in which each of the LiFSI and the one or more target impurities is substantially insoluble, wherein the at least one second anhydrous organic solvent is added in a minimum amount so as to precipitate the at least one target impurity, wherein the at least one second anhydrous organic solvent includes at least one solvent selected from the group consisting of dichloromethane, dichloroethane, chloroform, pentane, hexane, heptane, octane, nonane, decane, undecane, and dodecane;

following adding at least one second anhydrous organic solvent, filtering from the solution an insoluble portion of each of the one or more target impurities so as to produce a filtrate;

removing solvents from the filtrate so as to obtain a solid mass;

contacting the solid mass with at least one third anhydrous organic solvent in which the LiFSI is substantially insoluble so as to solvate a portion of the one or more target impurities, wherein the at least one third anhydrous organic solvent includes at least one solvent selected from the group consisting of dichloromethane, dichloroethane, chloroform, pentane, hexane, heptane, octane, nonane, decane, undecane, and dodecane; and isolating the LiFSI from the at least one third anhydrous organic solvent to obtain the purified LiFSI product.

2. The method of claim 1, wherein the crude LiFSI has a solubility in the at least one first anhydrous organic solvent of at least about 50% at room temperature, and each of the one or more target impurities has a solubility in the at least one first anhydrous organic solvent that is no more than about 20 parts per million (ppm) at room temperature.

3. The method of claim 1, wherein the contacting of the crude LiFSI with the at least one first anhydrous organic solvent is performed at a temperature below about 25° C.

4. The method of claim 1, further comprising controlling a temperature of the solution during the contacting of the crude LiFSI with the at least one first anhydrous organic solvent so as to maintain the temperature within about 2° C. of a target temperature.

5. The method of claim 1, wherein the filtering is performed in an inert atmosphere.

6. The method of claim 5, wherein the inert atmosphere comprises argon gas.

7. The method of claim 1, wherein removing solvents is performed in vacuo.

8. The method of claim 7, wherein removing solvents is performed at a pressure of about 0.1 Torr or less.

9. The method of claim 7, wherein removing solvents is performed at a temperature of less than about 40° C.

10. The method of claim 1, wherein isolating the LiFSI includes filtering the LiFSI in solid form from the at least one third anhydrous organic solvent.

11. The method of claim 10, wherein isolating the LiFSI includes drying the solid LiFSI in vacuo.

12. The method of claim 11, wherein drying the solid LiFSI in vacuo includes drying the solid LiFSI at a pressure of about 0.1 Torr or less.

13. The method of claim 1, wherein the one or more target impurities includes one or more target impurities from the group consisting of lithium chloride (LiCl), lithium fluoride (LiF), lithium sulfate ($Li_2SO_4$), lithium fluorosulfate ($LiSO_3F$), hydrogen fluoride (HF), and fluorosulfonic acid ($FSO_3H$).

14. The method of claim 1, wherein:
the one or more target impurities include lithium sulfate ($Li_2SO_4$); and
filtering an insoluble portion of each of the one or more target impurities includes simultaneously filtering an insoluble portion of the $Li_2SO_4$.

15. The method of claim 1, wherein contacting the crude LiFSI with at least one first anhydrous organic solvent includes contacting the crude LiFSI with an amount of the at least one first anhydrous organic solvent that is about 50 wt. % to about 75 wt. % of the solution.

16. The method of claim 15, wherein adding at least one second anhydrous organic solvent to the first solution includes adding the at least one second anhydrous organic solvent in an amount that is no more than about 10 wt. % of the solution.

17. The method of claim 1, wherein adding at least one second anhydrous organic solvent to the first solution includes adding the at least one second anhydrous organic solvent in an amount that is no more than about 10 wt. % of the solution.

18. The method of claim 1, further comprising placing the purified LiFSI product in a dry atmosphere within a container that is substantially non-reactive with free fluorine and storing the container at a temperature of less than about 25° C.

19. The method of claim 1, wherein the one or more target impurities are byproducts of a process of synthesizing the LiFSI in the crude LiFSI.

20. The method of claim 1, wherein the purified LiFSI product contains 10 parts per million (ppm) or less of LiCl.

21. The method of claim 20, wherein the purified LiFSI product contains less than 1 ppm of LiCl.

22. The method of claim 1, wherein the purified LiFSI product contains about 500 parts per million (ppm) or less of $FSO_3Li$, about 100 ppm or less of LiCl, and about 150 ppm or less of LiF.

* * * * *